United States Patent
Suda et al.

(10) Patent No.: US 6,718,240 B1
(45) Date of Patent: Apr. 6, 2004

(54) REMOTE KEYLESS ENTRY SYSTEM

(75) Inventors: Hirohide Suda, Tochigi (JP); Matthew J. Lehmer, Columbus, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 27 days.

(21) Appl. No.: 10/228,945

(22) Filed: Aug. 28, 2002

(51) Int. Cl.[7] .................................................. G06F 7/00
(52) U.S. Cl. ........................ 701/36; 701/49; 340/5.72; 340/5.7; 318/480
(58) Field of Search ............................. 701/1, 2, 36, 49; 340/5.72, 5.7, 825.22, 825.72, 825.29; 318/480

(56) References Cited

U.S. PATENT DOCUMENTS

| | | | |
|---|---|---|---|
| 4,451,887 A | | 5/1984 | Harada et al. |
| 4,707,788 A | | 11/1987 | Tashiro et al. |
| 5,513,107 A | | 4/1996 | Gormley |
| 5,708,415 A | * | 1/1998 | Van Lente et al. ......... 340/525 |
| 5,712,625 A | | 1/1998 | Murphy |
| 5,808,374 A | * | 9/1998 | Miller et al. ............... 307/10.1 |
| 6,100,811 A | | 8/2000 | Hsu et al. |
| 6,198,996 B1 | | 3/2001 | Berstis |
| 2002/0109583 A1 | * | 8/2002 | Losey ........................ 340/5.72 |
| 2002/0140545 A1 | * | 10/2002 | Nietupski et al. .......... 340/5.72 |
| 2003/0152088 A1 | * | 8/2003 | Kominami et al. ......... 370/401 |
| 2003/0186662 A1 | * | 10/2003 | Himmel et al. ........... 455/185.1 |

* cited by examiner

Primary Examiner—Thomas G. Black
Assistant Examiner—Ronnie Mancho
(74) Attorney, Agent, or Firm—Ditthavong & Carlson, P.C.

(57) ABSTRACT

A remote keyless entry system and method is described, in which a keyless entry vehicle key fob can be toggled between a guest mode and a driver-specific mode. When the key fob is in the guest mode, the key fob transmits no driver-specific identification to a receiver located in the vehicle, so that customizable vehicle settings are changed to predetermined default or guest mode settings. When the key fob is in the driver-specific mode, the key fob transmits a driver-specific identification to the receiver, so that customizable vehicle settings are reset to driver-specific customized vehicle settings.

19 Claims, 4 Drawing Sheets

REMOTE KEYLESS ENTRY SYSTEM

FIELD OF THE INVENTION

The present invention relates to automotive systems and more particularly to a remote keyless entry system.

BACKGROUND OF THE INVENTION

A remote keyless entry (RKE) system enables a person to lock and unlock an automobile or other kind of vehicle at distance without using a key. Typically, remote keyless entry systems employ a small, portable device known as a key fob that includes an authentication mechanism for controlling access to the vehicle. To gain access to the vehicle, the person presses an unlock button on the key fob, which causes a signal containing authentication information and an unlock command to be transmitted to a receiver inside the vehicle. An electronic control unit in the vehicle processes the signal, determining, based on the authentication information, whether the operator of the key fob is permitted access to the vehicle and unlocking the vehicle if access is authorized.

In recent years, automobiles and other kinds of vehicles are being furnished with an ever increasing array of owner-customizable settings. For example, an owner may be able to customize such features as the position of the seat and mirrors, the brightness of the dashboard and other interior lighting, the alarm system, the radio stations presets, and the desired interior temperature. In some vehicles, the owner's customized settings are associated with a corresponding key fob, so that when the owner uses the key fob to unlock the vehicle, the electronic control unit resets the customizable vehicle settings to the settings as last set by the owner. For example, when an owner uses a key fob to unlock a vehicle, the electronic control unit causes the seat and mirrors to return the position set by the owner.

However, while these vehicles enable the owner to program and memorize such settings for the owner's convenience, this feature is awkward when the vehicle is loaned to a guest. For example, the guest has to reprogram all the owner-customized settings to suit the needs of the guest, and the owner may not want to lose his/her stored personalized settings. As the number of customizable features increase, the reprogramming task becomes more onerous. Furthermore, the guest may not be aware of all the features that are customized and may assume that a particular, idiosyncratic setting of the owner is standard for the vehicle, which reduces the guest's pleasurable experience with the vehicle, deterring the guest from purchasing or renting a similar vehicle from the manufacturer. Therefore, there is a need for reducing the inconvenience and annoyance of a guest driver of a vehicle, while allowing the owner to continue to enjoy customizing various vehicle settings that are automatically reset when the owner unlocks the car via a key fob.

SUMMARY OF THE INVENTION

This and other needs are addressed by providing a non-driver-specific or "guest" mode that resets a customizable setting of a vehicle to a predetermined setting when the vehicle is unlocked via a key fob. The predetermined setting can be a factory default or the last setting used by the guest operator. Accordingly, the vehicle is automatically reset to a state that is convenient for the guest, without requiring the guest to reprogram a myriad of settings or suffer from the idiosyncrasies of the vehicle's owner.

In one embodiment, the key fob can be toggled between a guest mode and a driver-specific mode, for example, by pressing both the lock and the unlock buttons together. When the key fob is in the guest mode, the key fob transmits no driver-specific identification with an unlock command to a receiver located in the vehicle, so that an electronic control unit in the vehicle resets the customizable vehicle settings to default or guest mode settings. On the other hand, when the key fob is in the driver-specific mode, the key fob transmits driver-specific information, so that the customized vehicle settings are reset to the driver's specific settings.

Accordingly, one aspect of the present invention relates to a remote keyless entry system of a vehicle, that includes a receiver for receiving an unlock command from a key fob associated with the vehicle and an electronic control unit responsive to the receiver. The electronic control unit is configured for determining whether or not the unlock command indicates an operator associated with the key fob, and unlocking the vehicle and changing a configuration of the user-customizable subsystem of the vehicle to a predetermined setting if the unlock command does not indicate the operator associated with the key fob.

Another aspect pertains to a method and software for remote keyless entry of a vehicle, in which an unlock command from a key fob associated with the vehicle is received. If the unlock command does not indicate the operator associated with the key fob, then the vehicle is unlocked and the configuration of a user-customizable subsystem of the vehicle is changed to a predetermined setting.

Still another aspect involves a method for remote keyless entry of a vehicle, in which a transmission including a command to unlock the vehicle is received from a key fob associated with the vehicle. If the transmission includes the identifier of an operator associated with the key fob, then the vehicle is unlocked and the configuration of a user-customizable subsystem of the vehicle is changed to a setting that was customized by the operator associated with the key fob. On the other hand, if the transmission does not include the identifier of the operator associated with the key fob, then the vehicle is unlocked and the configuration of the user-customizable subsystem of the vehicle is changed to a predetermined setting.

Yet another aspect relates to a method for remote keyless entry of a vehicle, including receiving a transmission from a key fob associated with the vehicle, and determining whether the transmission includes an unlock command. If the transmission includes the unlock command, then the vehicle is unlocked and it is determined whether the transmission contains an identifier of an operator associated with the key fob. If the transmission contains the identifier of the operator associated with the key fob, then the configuration of a user-customizable subsystem of the vehicle is changed to a setting that was customized by the operator associated with the key fob. If the transmission does not include the identifier of the operator associated with the key fob, then the configuration of the user-customizable subsystem is changed to a predetermined setting.

In another aspect, a method is provided for remote keyless entry of a vehicle, in which a transmission from a key fob associated with the vehicle includes a command to unlock the vehicle and an identifier having either a first value or a second value. If the identifier has the first value, then the vehicle is unlocked and the configuration of a user-customizable subsystem of the vehicle is changed to a first predetermined setting. If the identifier has the second value, then the vehicle is unlocked and the configuration of the user-customizable subsystem to a second predetermined setting other than the first predetermined setting.

Furthermore, still another aspect of the present invention relates to a remote keyless entry system and method for a vehicle. The system includes at least two key fobs associated with the vehicle that transmit a command to unlock the vehicle along with an identifier. The identifier has a value that corresponds to the key fob or a value common to all of the key fobs. A receiver is configured for receiving from any of the key fobs a transmission that includes the command to unlock the vehicle and the identifier. An electronic control unit, in response to receipt of the transmission, causes the vehicle to be unlocked, determines a setting for a user-customizable subsystem of the vehicle based on a value of the identifier, and changes the configuration to the determined setting.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for remote keyless entry are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
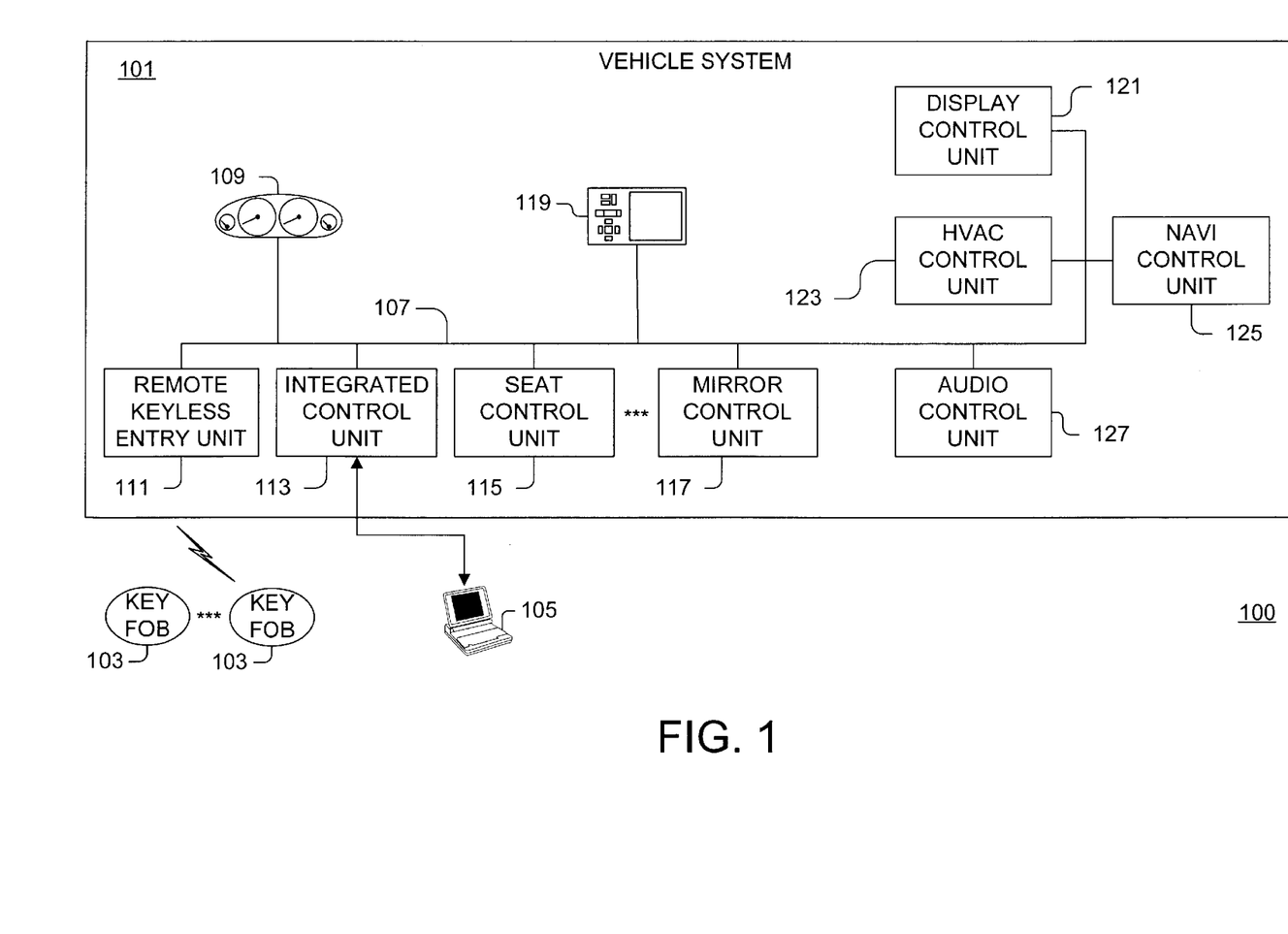
FIG. 1 depicts a vehicle system that can be used to implement an embodiment of the present invention.

Referring to FIG. 1, a remote keyless entry system 100 includes a vehicle system 101, one or more vehicle key fobs 103, and a dealer access device 105, such as a diagnostic computer. The vehicle system 101 includes one or more buses or networks 107 (e.g., a body and/or chassis controller area network [CAN], etc.) for providing communications between various vehicle sub-systems, such as vehicle instrumentation 109, a remote keyless entry unit 111, an integrated control unit (ICU) 113, a seat control unit 115, a mirror control unit 117, a user and navigational (NAVI) display and interface 119, a display control unit 121, a heating, ventilation, and air conditioning (HVAC) control unit 123, a navigational control unit 125, and an audio control unit 127.

The key fobs 103 provide various functions, including, for example, remote keyless entry to the vehicle via a wireless radio link. In one embodiment, the key fobs 103 are remote electronic devices, for example, which can be attached to a key chain, and that transmit commands to a receiver located in a vehicle for remotely controlling access to the vehicle, such as vehicle entry, trunk entry, gas receptacle entry, and alarm system setting and resetting.

The user interface unit 119 can be used to set and access the vehicle system 101 settings, such as settings for the door lock and unlock, keyless entry, power window, interior lighting, head lamp, warning indicator, trunk entry, alarm system, suspension, traction control, audio, video display, navigation, communications equipment, and climate control. Some settings, such as those of the seats, mirrors, and radio station presets, can be set directly in the course of their use. In addition, a dealer also can set and/or access the vehicle system 101 settings via the dealer access device 105 and the integrated control unit 113.

Further, the user of the vehicle can remotely access the user interface unit 119 to set and/or access the vehicle system 101 settings, for example, via a user access device, such as a handheld device, a personal digital assistant (PDA), computer, etc., over a wireless communications link with the user interface unit 119. In another embodiment, the user can access a dealer web site and download vehicle system 101 settings to be programmed via the user access device and the user interface unit 119.

Figure 2:
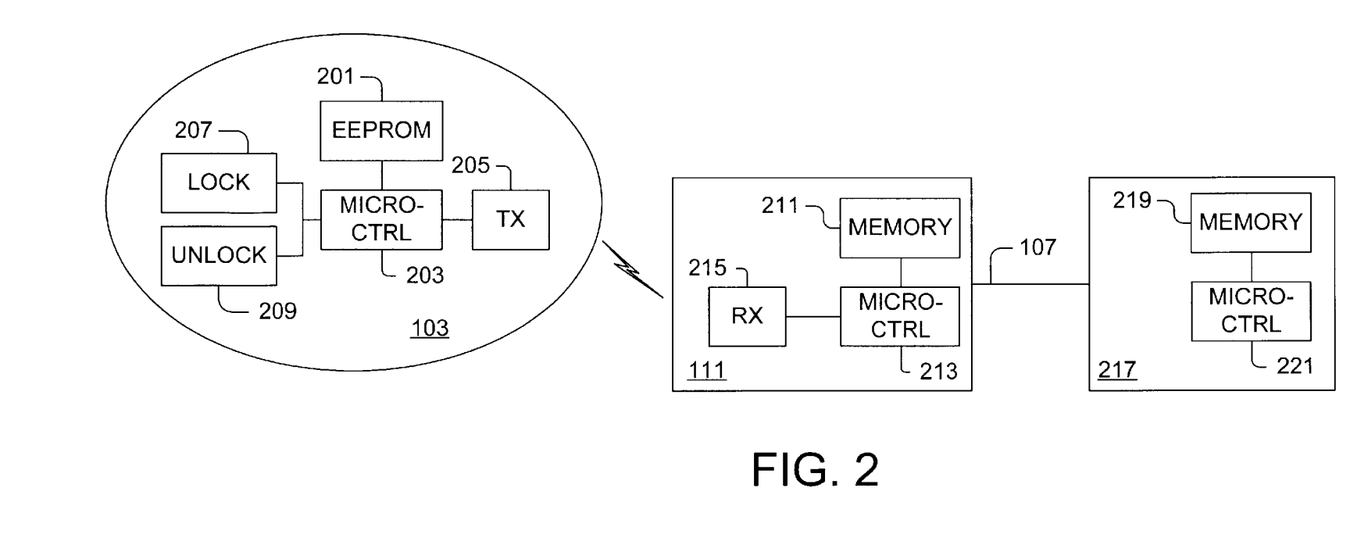
FIG. 2 depicts a key fob, remote keyless entry unit, and a control unit of the vehicle system of FIG. 1.

FIG. 2 depicts the key fob 103, the remote keyless entry unit 111, and a control unit 217 (e.g., any one of the units 109, 113, 115, 117, 119, 121, 123, 125, 127, etc.) of the keyless entry vehicle system 100 of FIG. 1 in further detail. As shown in FIG. 2, the key fob 103 includes, for example, a memory, such as an EEPROM 201, a processor, such as a micro-controller 203, a wireless transmitter (TX) 205, a lock button 207, and an unlock button 209. The key fob 103 transmits data packets to the remote keyless entry unit 111, which includes, for example, a memory 211, a micro-controller 213, and a wireless receiver (RX) 215. The wireless transmitter 205 and receiver 215 may employ any wireless communication technology, including radio frequency (RF), infrared (IR), and BlueTooth.

The remote keyless entry unit 111 receives the data packets from the key fob 103 and places the corresponding data on the bus 107 for commanding the control unit 217 to perform various functions, such as vehicle entry, trunk entry, gas receptacle entry, or alarm system related functions. The control unit 217 also can include a memory 219 and a micro-controller 221.

Figure 3:
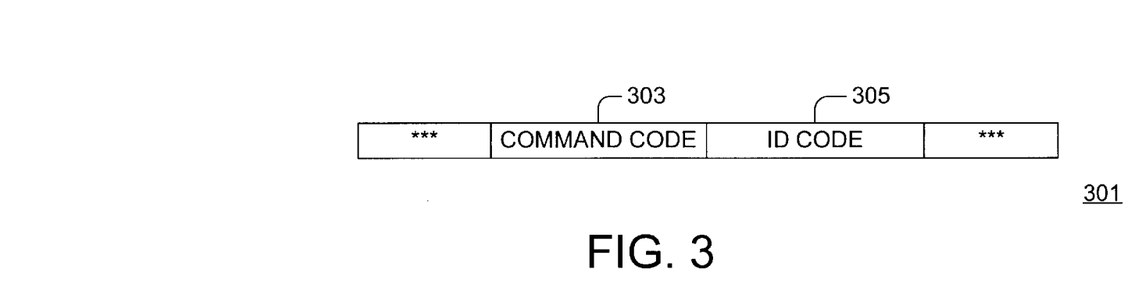
FIG. 3 depicts a data packet transmitted from the key fob to the remote keyless entry unit of FIG. 2.

FIG. 3 depicts an example of a data packet 301 that can be transmitted from the key fob 103 to the remote keyless entry unit 111 of FIG. 2. In FIG. 3, the data packet includes various data fields, such as a command code 303, and identification (ID) code 305 (e.g., 2 bit data). The key fob 103 further is configured, when both lock 207 and unlock 209 buttons are pressed (e.g., for about two seconds), to toggle between a guest mode and a driver-specific mode.

Once the key fob 103 is placed in the guest mode, when the unlock button 209 once again is pressed, the key fob 103 fonmulates the data packet 301, with no driver-specific identification (e.g., null data or all zero bits) in the ID code 305 and an unlock command in the command code 303, and transmits the data packet 301 to the receiver 215 of the remote keyless entry unit 111. The remote keyless entry unit 111 receives the data packet 301 and places the corresponding data on the bus 107. Then, when the controller 217 determines that no driver-specific identification has been transmitted, the controller 217 resets the customizable vehicle settings to predetermined default or guest mode settings. Advantageously, the guest driver is saved from the inconvenience of having to reprogram the myriad of driver-specific customized vehicle settings.

On the other hand, when the key fob 103 is placed in the driver-specific mode, pressing the unlock button 209 on the key fob 103 causes the key fob 103 to transmit the data packet 301 with a driver-specific identification in the ID code 305 and an unlock command in the command code 303, to the receiver 215 of the remote keyless entry unit 111. The remote keyless entry unit 111 receives the data packet 301 and places the corresponding data on the bus 107. Then, when the controller 217 determines that the driver-specific identification has been transmitted, the controller 217 sets the customizable vehicle settings to driver-specific customized vehicle settings.

Accordingly, the vehicle settings can be modified and memorized (e.g., in the memory 219) in the controller 217 for each individual driver of a particular vehicle. In this way, if the driver wishes to lend the vehicle to a friend, guest, family member, etc., the driver can temporarily toggle the key fob 103 to the guest mode for setting the default settings on the control unit 217, without erasing the driver-specific custom vehicle settings on the control unit 217, which can be later restored by toggling the key fob 103 to the driver-specific mode.

Each keyless vehicle entry key fob 103 can include a different driver-specific ID associated with the key fob 103. Then, each key fob 103 can be set to transmit or not transmit the driver-specific ID, when the unlock button 209 is pressed. If the driver-specific ID is transmitted with the unlock command, the driver-specific custom memory settings for the corresponding driver (e.g., which were previously stored) are restored from the memory 219. If the driver-specific ID is not transmitted with the unlock signal, default or factory settings are restored from the memory 219. The default settings are then used until a driver-specific ID is once again received.

In a preferred embodiment, some customizable vehicle settings are unaffected, while other settings are affected, when the key fob 103 does not transmit a driver-specific ID. For example, the seat positions and mirror positions need not move when no driver-specific ID is transmitted. This behavior is based on the observation that guest drivers typically use a vehicle several times before returning the vehicle to the owner and that there is no clear default for a seat and mirror position based on the diversity of human shapes and sizes. Therefore, it is desirable not to move the seat and mirror positions so that the seats and mirrors remain in the same position for the next time the guest uses the vehicle. Alternatively, in more advanced models, a memory can be provided for recording the seat and mirror position of the guest user. The radio and HVAC settings, on the other hand, are preferably reset to a memorized guest setting when no driver-specific ID is transmitted.

Accordingly, while in the guest mode, the guest mode vehicle settings can be modified by the guest and then saved to the memory 219. In this way, when the vehicle is next used by the guest, the saved guest mode vehicle settings can be restored from the memory 219. Alternatively, various vehicle settings can be reset to predetermined factory default settings when no driver-specific ID is transmitted, but the present invention is not limited to any specific combination of settings. The various vehicle settings may include, for example: door lock/unlock characteristics, e.g., whether all the doors lock when the car is shifted from park to drive; keyless acknowledgement, e.g., beep only, etc.; security settings, e.g., relock timer, etc.; interior light timer; auto headlights, e.g., when to turn on automatically; alarm/warning, e.g., how the driver is signaled that the parking brake is engaged; and power windows, e.g., whether the windows can be activated by the key fob 103.

Although vehicle settings can be reset and not reset in the guest mode, the vehicle settings that are reset to a default setting in the guest mode, preferably include, for example, vehicle settings that have some logical default value, such as vehicle settings that typically are not customizable by an individual driver, but rather are set by the vehicle manufacturer based on market research. On the other hand, the vehicle settings that are not reset to a default setting in the guest mode may include vehicle settings that have no logical default setting, such as vehicle settings that typically are customizable by the individual user.

Figure 4:
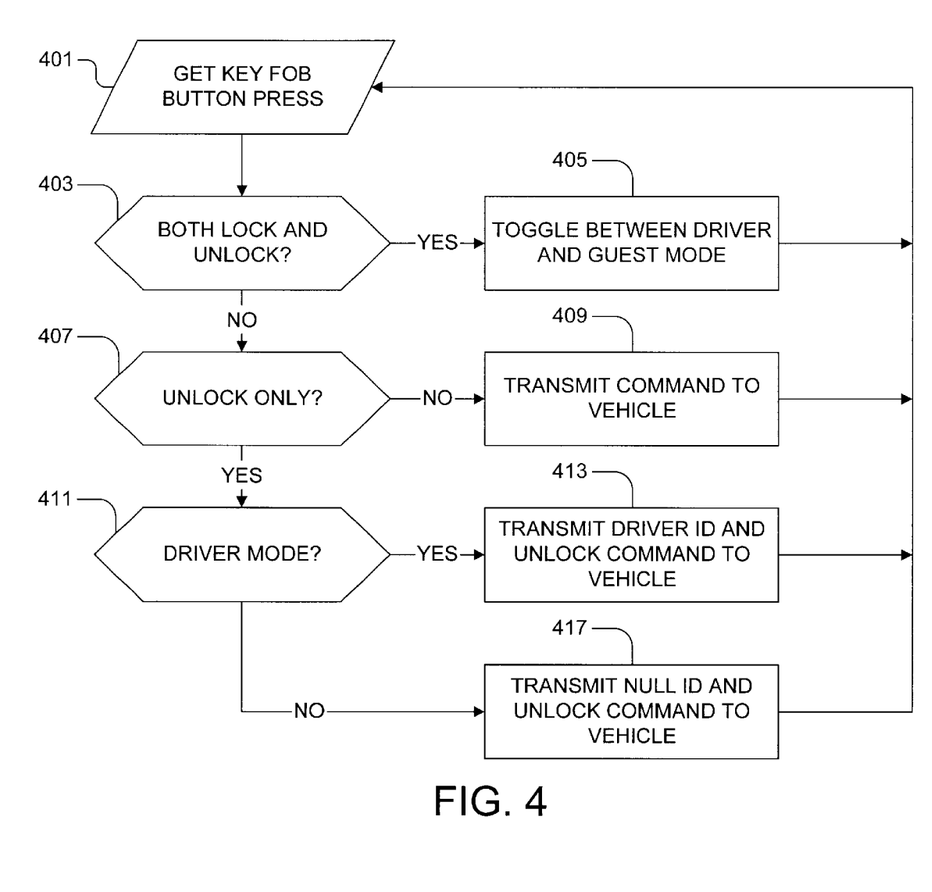
FIG. 4 is a flowchart for illustrating the operation of the key fob of FIG. 2.

FIG. 4 is a flowchart for illustrating the operation of the key fob 103 of FIG. 2. Accordingly, in FIG. 4, at step 401, the key fob 103 detects pressing of the lock 207 and/or unlock 209 buttons. If both the lock 207 and unlock 209 buttons are detected to be pressed at step 403, the key fob 103 toggles between the guest and driver modes at step 405.

Otherwise, at step 407, the key fob 103 detects whether or not only the unlock button 209 is pressed. If the unlock 209 button is detected to not have been pressed at step 407, the key fob 103 transmits the corresponding command in the command code 303 to the controller 217 at step 409.

Otherwise, at step 411, the key fob 103 detects if the key fob 103 is in the driver mode and if so, the key fob 103 transmits the unlock command in the command code 303 and the driver-specific ID in the ID code 305 to the controller 217 at step 413. If the driver mode is not detected at step 411, the key fob 103 transmits the unlock command in the command code 303 to the controller 217 with no driver-specific ID (e.g., null data or all zero bits) in the ID code 305 at step 417.

Figure 5:
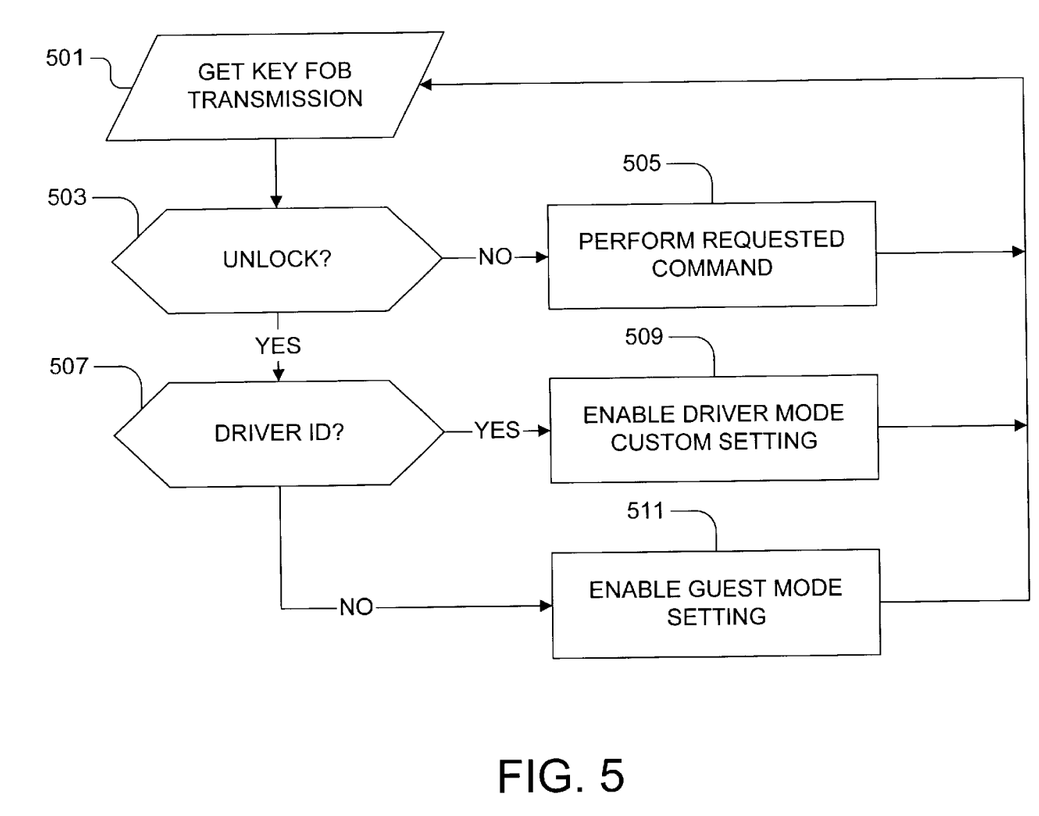
FIG. 5 is a flowchart for illustrating the operation of the control unit of FIG. 2.

FIG. 5 is a flowchart for illustrating the operation of the control unit 217 of FIG. 2. Accordingly, in FIG. 5, at step 501, the control unit 217 detects a transmission from the key fob 103. If the transmission does not include an unlock command in the command code 303, as determined in step 503, the requested command in the command code 303 is performed by the control unit 217 at step 505.

Otherwise, at step 507, the control unit 217 determines if the transmission from the key fob 103 includes a driver-specific ID in the ID code 305. If the transmission does include a driver-specific ID in the ID code 305, the control unit 217 enables the driver-specific custom vehicle settings from the memory 219 at step 507. Otherwise, at step, 511, the control unit 217 enables the guest mode or default vehicle settings from the memory 219.

It is to be understood that the remote keyless entry system 100 of FIGS. 1–5 is for exemplary purposes, as many variations of the specific hardware used to implement the embodiments of the present invention are possible, as will be appreciated by those skilled in the relevant art. For example, the functionality of the devices and the subsystems of the system 100 can be implemented via one or more programmed computer systems or devices.

Accordingly, the devices and subsystems of the remote keyless entry system 100 of FIGS. 1–5 can include, for example, any suitable servers, workstations, personal computers (PCs), laptop computers, PDAs, Internet appliances, set top boxes, modems, handheld devices, telephones, cellular telephones, wireless devices, other devices, etc., capable of performing the processes of the embodiments of the present invention. One or more interface mechanisms can be used in the system 100 including, for example, Internet access, telecommunications in any form (e.g., voice, modem, etc.), wireless communications media, etc.

To implement such variations as well as other variations, a single computer system can be programmed to perform the special purpose functions of one or more of the devices and subsystems of the remote keyless entry system 100. On the other hand, two or more programmed computer systems or devices can be substituted for any one of the devices and subsystems of the remote keyless entry system 100. Accordingly, principles and advantages of distributed processing, such as redundancy, replication, etc., also can be implemented as desired to increase the robustness and performance of the remote keyless entry system 100, for example.

The remote keyless entry system 100 can store information relating to various processes described herein. This information can be stored in one or more memories (e.g., memories 201, 211 and 219), such as a hard disk, optical disk, magneto-optical disk, RAM, etc., of the devices of the remote keyless entry system 100. The one or more memories of the devices and subsystems of the remote keyless entry system 100 of FIGS. 1–5 also can store the information used to implement the embodiments of the present invention. The information can be organized using data structures (e.g., records, tables, arrays, fields, graphs, trees, and/or lists) included in the one or more memories, such as the memories listed above or any of the storage devices listed below.

The previously described processes can include appropriate data structures (e.g., the data packet 301) for storing data collected and/or generated by the processes of the remote keyless entry system 100 of FIGS. 1–5 in the one or more memories thereof. Such data structures accordingly can include fields for storing such collected and/or generated data.

All or a portion of the remote keyless entry system 100 (e.g., as described with respect to FIGS. 1–5) can be conveniently implemented using one or more conventional general purpose computer systems, microprocessors, digital signal processors, micro-controllers (e.g., the micro-controllers 203, 213, and 221), etc., programmed according to the teachings of the embodiments of the present invention, as will be appreciated by those skilled in the computer and software arts. Appropriate software can be readily prepared by programmers of ordinary skill based on the teachings of the present disclosure, as will be appreciated by those skilled in the software arts. Further, the remote keyless entry system 100 can include functions performed over the World Wide Web. In addition, the remote keyless entry system 100 can be implemented by the preparation of application-specific integrated circuits or by interconnecting an appropriate network of conventional component circuits, as will be appreciated by those skilled in the electrical arts.

The one or more memories (e.g., the memories 201, 211 and 219) can include a main memory, such as a random access memory (RAM) or other dynamic storage device for storing information and instructions to be executed by the one or more processors (e.g., the micro-controllers 203, 213 and 221). The main memory can also be used for storing temporary variables or other intermediate information during execution of instructions by the one or more processors. The one or more memories can further include a read only memory (ROM) or other static storage device for storing static information and instructions for the one or more processors. A storage device, such as a magnetic disk or optical disk, can be coupled to the bus 107 for persistently storing information and instructions.

The display of the user interface unit 119 can include a display device, such as a cathode ray tube (CRT), liquid crystal display (LCD), active matrix display, plasma display, etc., for displaying information to a user of the vehicle system 101. An input device, such as buttons including alphanumeric and other keys, etc., for communicating information and command selections to the one or more processors can be included in the user interface unit 119. Another type of user input device, such as a mouse, a trackball, cursor direction keys, etc., can be provided in the user interface unit 119 for cursor control for communicating direction information and command selections to the one or more processors and for controlling cursor movement on the display of user interface unit 119.

According to one embodiment of the invention, remote keyless entry is provided in response to the one or more processors executing an arrangement of instructions contained in the main memory. Such instructions can be read into the main memory from another computer-readable medium, such as a storage device. Execution of the arrangement of instructions contained in the main memory causes the one or more processors to perform the process steps described herein (e.g., with respect to FIGS. 1–5). The one or more processors, in a multi-processing arrangement, also can be employed to execute the instructions contained in the main memory. In alternative embodiments, hard-wired circuitry can be used in place of or in combination with software instructions to implement the embodiments of the present invention. Thus, the embodiments of the present invention are not limited to any specific combination of hardware circuitry and/or software.

Wireless links can also be implemented. In any such implementation, electrical, electromagnetic, optical, etc., signals that carry digital data streams representing various types of information can be employed. Further, the user interface unit 119 can include peripheral interface devices, such as a Universal Serial Bus (USB) interface, a PCMCIA (Personal Computer Memory Card International Association) interface, etc. In addition, multiple communication interfaces also can be employed in the user interface unit 119.

The term "computer-readable medium" as used herein refers to any medium that participates in providing instructions to the one or more processors for execution. Such a medium can take many forms, including but not limited to non-volatile media, volatile media, and transmission media. Non-volatile media include, for example, optical or magnetic disks, such as a storage device. Volatile media include dynamic memory, such as the main memory. Transmission media can include coaxial cables, copper wire and fiber optics, including the wires that comprise the bus 107. Transmission media can also take the form of acoustic, optical, or electromagnetic waves, such as those generated during radio frequency (RF) and infrared (IR) data communications.

Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Accordingly, a remote keyless entry system and method is described in which the key fob 103 can be toggled between a guest mode and a driver-specific mode. In the guest mode, the key fob 103 transmits no driver-specific identification to the vehicle system 101, which sets the customizable vehicle settings to the default or the guest mode settings, if the unlock command also is received. In the driver-specific mode, the key fob 103 transmits the driver-specific identification to the vehicle system 101, which sets driver-specific customized vehicle settings, rather than the default or guest mode settings, if the unlock command also is received. Advantageously, the default settings can include predetermined or factory settings, thus, reducing the inconvenience of the guest driver.

While the present invention has been described in connection with a number of embodiments and implementations, the present invention is not so limited but covers various obvious modifications and equivalent arrangements, which fall within the purview of the appended claims.

What is claimed is:

1. A remote keyless entry system of a vehicle, comprising:
   a receiver for receiving an unlock command from a key fob associated with the vehicle; and
   an electronic control unit responsive to the receiver and configured for:
      determining whether or not the unlock command indicates an operator associated with the key fob; and
      unlocking the vehicle and changing a configuration of the user-customizable subsystem of the vehicle to a predetermined setting if the unlock command does not indicate the operator associated with the key fob.

2. A system as according to claim 1, wherein the electronic control unit is further configured for:
   changing a configuration of a user-customizable subsystem of the vehicle to a setting that was customized by the operator associated with the key fob if the unlock command indicates the operator associated with the key fob, and unlocking the vehicle.

3. A system as according to claim 1, wherein the predetermined setting is a guest setting.

4. A system as according to claim 1, wherein the predetermined setting is a default setting.

5. A system as according to claim 1, further comprising the key fob, wherein:
   the key fob is associated with an identifier indicating the operator, and
   the key fob is configured to operate in at least a first mode and a second mode, wherein:
      in the first mode, the identifier is transmitted along with the unlock command, and
      in the second mode, the identifier is not transmitted along with the unlock command.

6. A system as according to claim 5, wherein, in the second mode, a predetermined code not corresponding to the operator is transmitted along with the unlock command.

7. A system as according to claim 6, wherein the predetermined code has a value different from a value of the identifier indicating the operator.

8. A system as according to claim 6, wherein the predetermined code corresponds to a guest operator.

9. A system as according to claim 1, further comprising:
   a user interface in the vehicle configured to set a user-customizable setting and the predetermined setting for the configuration of the subsystem of the vehicle.

10. A method for remote keyless entry of a vehicle, comprising:
    receiving an unlock command from a key fob associated with the vehicle;
    determining whether or not the unlock command indicates an operator associated with the key fob; and
    if the unlock command does not indicate the operator associated with the key fob, then unlocking the vehicle and changing a configuration of a user-customizable subsystem of the vehicle to a predetermined setting.

11. A method as according to claim 10, further comprising:
    if the unlock command indicates the operator associated with the key fob, then unlocking the vehicle and changing a configuration of a user-customizable subsystem of the vehicle to a setting that was customized by the operator associated with the key fob.

12. A computer-readable medium bearing instructions for remote keyless entry of a vehicle, said instructions being arranged, upon execution, to cause one or more processors to perform the steps of:
    receiving an unlock command from a key fob associated with the vehicle;
    determining whether or not the unlock command indicates an operator associated with the key fob; and
    if the unlock command does not indicate the operator associated with the key fob, then unlocking the vehicle and changing a configuration of a user-customizable subsystem of the vehicle to a predetermined setting.

13. A computer-readable medium as according to claim 12, wherein the instructions are further arranged to cause the one or more processors to perform the step of:
    if the unlock command indicates the operator associated with the key fob, then unlocking the vehicle and changing a configuration of a user-customizable subsystem of the vehicle to a setting that was customized by the operator associated with the key fob.

14. A method for remote keyless entry of a vehicle, comprising:
    receiving a transmission from a key fob associated with the vehicle, said transmission including a command to unlock the vehicle;
    determining whether the transmission includes an identifier of an operator associated with the key fob;
    if the transmission includes the identifier of an operator associated with the key fob, then performing the steps of unlocking the vehicle and changing a configuration of a user-customizable subsystem of the vehicle to a setting that was customized by the operator associated with the key fob; and
    if the transmission does not include the identifier of the operator associated with the key fob, then performing the steps of unlocking the vehicle and changing a configuration of the user-customizable subsystem of the vehicle to a predetermined setting.

15. A method for remote keyless entry of a vehicle, comprising:
    receiving a transmission from a key fob associated with the vehicle;

determining whether the transmission includes an unlock command;

if the transmission includes the unlock command, then performing the steps of:
unlocking the vehicle;
determining whether the transmission contains an identifier of an operator associated with the key fob;
if the transmission includes the identifier of the operator associated with the key fob, then changing a configuration of a user-customizable subsystem of the vehicle to a setting that was customized by the operator associated with the key fob; and
if the transmission does not include the identifier of the operator associated with the key fob, then changing a configuration of the user-customizable subsystem of the vehicle to a predetermined setting.

16. A method for remote keyless entry of a vehicle, comprising:

receiving a transmission from a key fob associated with the vehicle, said transmission including a command to unlock the vehicle and an identifier having either a first value or a second value;

if the identifier has the first value, then performing the steps of: unlocking the vehicle and changing a configuration of a user-customizable subsystem of the vehicle to a first predetermined setting; and if the identifier has the second value, then performing the steps: unlocking the vehicle and changing a configuration of a user-customizable subsystem of the vehicle to a second predetermined setting other than the first predetermined setting.

17. A remote keyless entry system for a vehicle, comprising:

a plurality of key fobs associated with the vehicle for transmitting a command to unlock the vehicle along with an identifier having either a respective value corresponding to the key fob or a value common to all of the key fobs;

a receiver for receiving a transmission from any of the key fobs, said transmission including the command to unlock the vehicle and the identifier; and an electronic control unit for performing, in response to receipt of the transmission, the steps of: unlocking the vehicle, determining a setting for a user-customizable subsystem of the vehicle based on a value of the identifier, and changing a configuration of the user-customizable subsystem to the determined setting.

18. A system according to claim 17, wherein:

each of the key fobs is associated with an identifier indicating an operator of the vehicle, and each of the key fobs is configured to operate in at least a first mode and a second mode, wherein:
in the first mode, the identifier is transmitted along with the unlock command, and
in the second mode, the identifier is not transmitted along with the unlock command.

19. A method of remote keyless entry for a vehicle, comprising:

receiving a transmission from any of a plurality of key fobs, said plurality of key fobs being associated with the vehicle for transmitting a command to unlock the vehicle along with an identifier having either a respective value corresponding to one of the key fobs or a value common to all of the key fobs; and in response to the transmission, performing the steps of: unlocking the vehicle, determining a setting for a user-customizable subsystem of the vehicle based on a value of the identifier, and changing a configuration of the user-customizable subsystem to the determined setting.

* * * * *